United States Patent [19]

Chattin

[11] Patent Number: 4,968,096

[45] Date of Patent: Nov. 6, 1990

[54] DUMP TRAILER WITH LIFTING MECHANISM

[75] Inventor: Elmer J. Chattin, Fredericktown, Ohio

[73] Assignee: Ohio Steel Industries, Inc., Columbus, Ohio

[21] Appl. No.: 256,980

[22] Filed: Oct. 13, 1988

[51] Int. Cl.⁵ .............................................. B60P 1/04
[52] U.S. Cl. ........................................ 298/6; 414/482; 298/20 R
[58] Field of Search .................. 298/5, 6, 17 R, 19 B, 298/19 R, 20 R, 15, 23 TT, 22 D, 22 J; 414/476, 478, 469, 482, 483, 485

[56] References Cited

U.S. PATENT DOCUMENTS 2,131,326 9/1938 Kaster ................................. 298/6 X
3,692,362 9/1972 Craske ..................................... 298/5

FOREIGN PATENT DOCUMENTS 176450 10/1953 Fed. Rep. of Germany .... 298/20 R
185247  4/1956 Fed. Rep. of Germany .......... 298/5
192264 10/1957 Fed. Rep. of Germany .......... 298/5
 78667  9/1931 Sweden ............................. 298/23 F Primary Examiner—Robert J. Spar
Assistant Examiner—James T. Eller
Attorney, Agent, or Firm—Porter, Wright, Morris & Arthur

[57] ABSTRACT

A cargo-receiving bed is pivotally mounted upon a wheeled undercarriage. An elongated actuator is telescopically and slidably mounted in the undercarriage and is hitched at its free end to a tractor. A lifting mechanism is connected to a portion of the actuator extending into the undercarriage to raise and lower the cargo bed. In one embodiment, the lifting mechanism comprises a pair of jointed arms each connected at one end to the cargo bed and at the other to the actuator. Suitable stop and guide members are provided to urge the arms into elevated positions as the actuator moves into the undercarriage and lowered positions as the actuator moves out of the undercarriage. An alternative lifting mechanism includes a lifting cam and a series of pivotally connected rods. Inward movement of the actuator causes the cam lifting surface to rotate upwardly against the underside of the cargo bed. Simultaneously, a pivotal connection between the rods rises and carries the bed further upwardly after the cam movement has run its course.

4 Claims, 3 Drawing Sheets

DUMP TRAILER WITH LIFTING MECHANISM

TECHNICAL FIELD

The present invention relates to lawn and garden trailer carts adapted for attachment to a tractor and more particularly to those equipped with a cargo bed which is pivotally mounted upon a wheeled chassis for movement between a generally horizontal, cargo-carrying position and an inclined, cargo-dumping position.

BACKGROUND

In the past, lawn and garden trailers have relied upon gravity and/or manual assistance in lifting the cargo bed from horizontal to inclined positions. Many such trailers were unable to attain a satisfactory dumping angle because they were pivotally connected to the chassis near the transverse midline on the cargo bed. In this manner, a substantial portion of the cargo weight was disposed rearwardly of the pivot points, thereby easing the task of lifting the front end of the cargo bed, but limiting the dump angle when the rear end of the cargo bed touched ground. Typically, it was necessary for the operator to leave the tractor and assist in the unloading process by opening and closing the tailgate and/or by moving the bed between cargo carrying and dumping positions. Thus, the present inventor was faced with the problems of devising a dump trailer lifting mechanism that would use the tractor's power to lift the cargo bed sufficiently high to unload the cargo.

SUMMARY AND OBJECTS OF THE INVENTION

A dump trailer according the present invention comprises a wheeled undercarriage; an elongated actuator telescopically mounted on the undercarriage for movement in relatively opposing directions; a hitch component attached to the actuator; a cargo bed pivotally mounted upon the undercarriage; and lift components disposed between the undercarriage and the cargo bed for movement between elevated and lowered positions. The lift components are responsive to the movement of the actuator to raise and lower the cargo bed.

Preferably, the lift components include a jointed arm pivotally connected at one end to the actuator and at an opposite end to the cargo bed, a stop component disposed between the arm and the cargo bed for limiting pivotal movement of said arm relative to the cargo bed as the actuator moves in one direction, and a guide component disposed between the undercarriage and the arm for engaging the arm and urging it toward its lowered position as the actuator moves in the opposite direction. Alternatively, the lift components may include a first rod pivotally connected to the actuator, a second rod pivotally connected to the first rod, a third rod pivotally connected at one end to the second rod and at an opposite end to the undercarriage of the dump trailer, and a cam pivotally connected at an upper end to the undercarriage in spaced relation to the third rod and at a lower end to the first rod.

The primary object of the present invention is to provide a dump trailer with a lift mechanism which moves the cargo bed between seated and inclined positions as a result of forward and reverse movements of a tractor to which it is attached. Another object of the present invention is to provide a dump trailer which may be emptied without requiring the operator to dismount from the tractor. Yet another object of the present invention is to provide a dump trailer having a cargo bed which is pivotally mounted upon an undercarriage substantially rearwardly of the transverse centerline of the body. The foregoing objects and advantages, as well as others, may be more readily understood in view of the following drawings and description of the preferred embodiments.

DETAILED DESCRIPTION OF THE PREFERRED EMBODIMENTS

Figure 1:
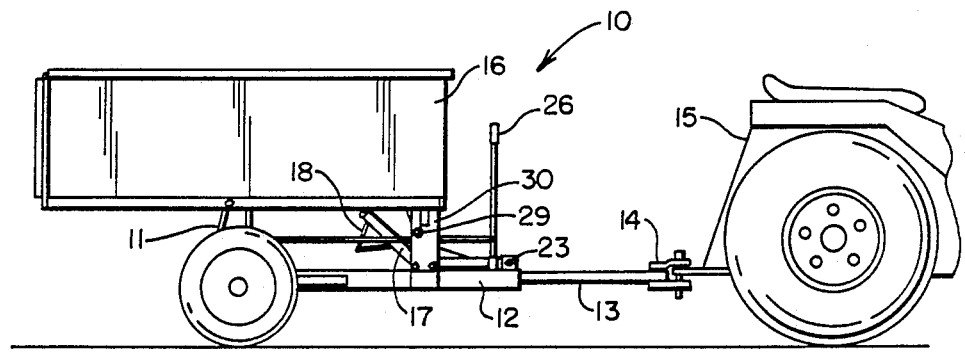
FIG. 1 is a side elevational view of a dump trailer according to the present invention and of a rear portion of a tractor to which the trailer is attached.
Figure 2:
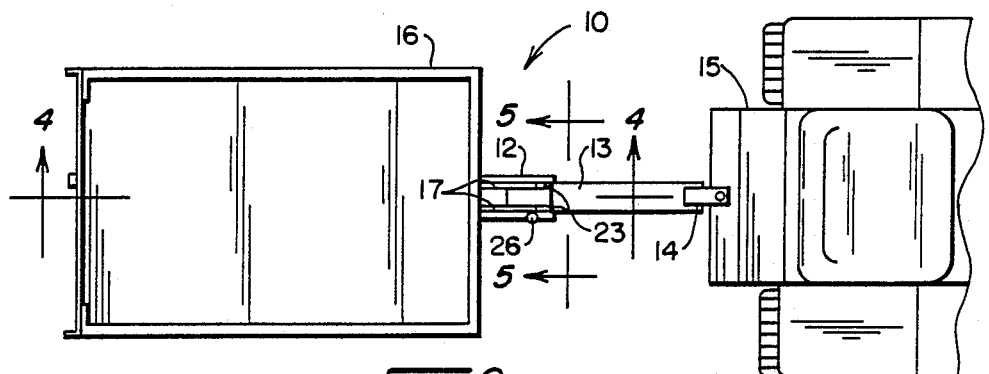
FIG. 2 is a top plan view of the trailer and tractor shown in FIG. 1.
Figure 3:
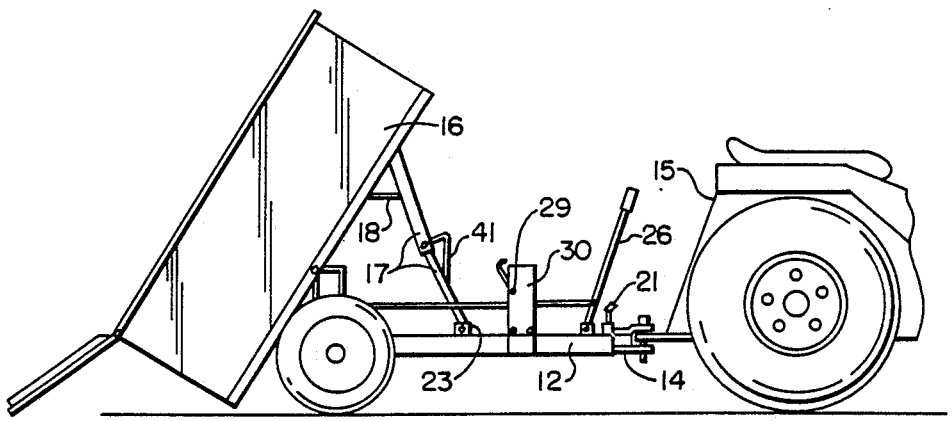
FIG. 3 is a side elevational view of the trailer and tractor of FIGS. 1 and 2, with the cargo bed in an inclined position.

As indicated in FIGS. 1-5, a dump trailer, generally designated 10 and embodying the present invention, includes a wheeled undercarriage 11 equipped with a longitudinally extending beam 12; an elongated actuator 13 telescopically mounted on the beam 12 for movement between retracted (FIG. 3) and extended (FIG. 1) positions relatively to the beam 12; a hitch component 14 attached to the actuator 13 and adapted to connect the present dump trailer 10 to a tractor 15 or other motorized vehicle; a cargo bed or body 16 pivotally mounted on the undercarriage 11 for movement between seated and inclined positions relative to the undercarriage 11; a pair of jointed or articulated arms 17 each pivotally connected at one end to the actuator 13 and at the opposite end to the cargo bed 16 for movement between generally collapsed and erect positions relatively to the actuator 13; a stop component 18 mounted on the arms 17 adjacent to the cargo bed 16 for urging the arms towards the erect position as the actuator 13 moves to the retracted position; and a guide component 29 mounted on the beam 12 for engaging the arms 17 as the actuator 13 moves towards the extended position, thereby urging said arms 17 towards their collapsed positions.

Figure 5:
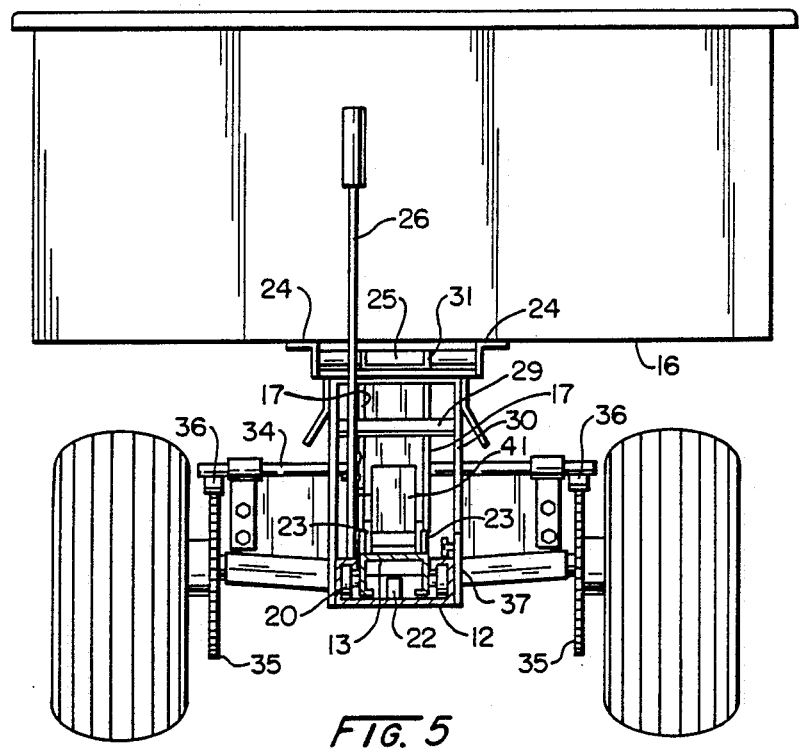
FIG. 5 is an enlarged sectional and end elevational view of the present dump trailer taken along line 5—5 of FIG. 2.

Preferably, the present dump trailer 10 is constructed principally from steel. As indicated in FIG. 5, the beam 12 is generally U-shaped in cross-sectional configuration and defines an upwardly opening channel in which the actuator or tongue 13 is telescopically mounted. Antifriction elements 20 extend on axles from opposite sides of the actuator 13 and are rotatively disposed in opposing side channels of the beam 12. The actuator 13 is also generally U-shaped in cross-sectional configuration and is disposed within the space between the side walls of the beam 12. The height of the actuator 13 is such that its upper surface is slightly higher than the side walls of the beam 12.

Figure 4:
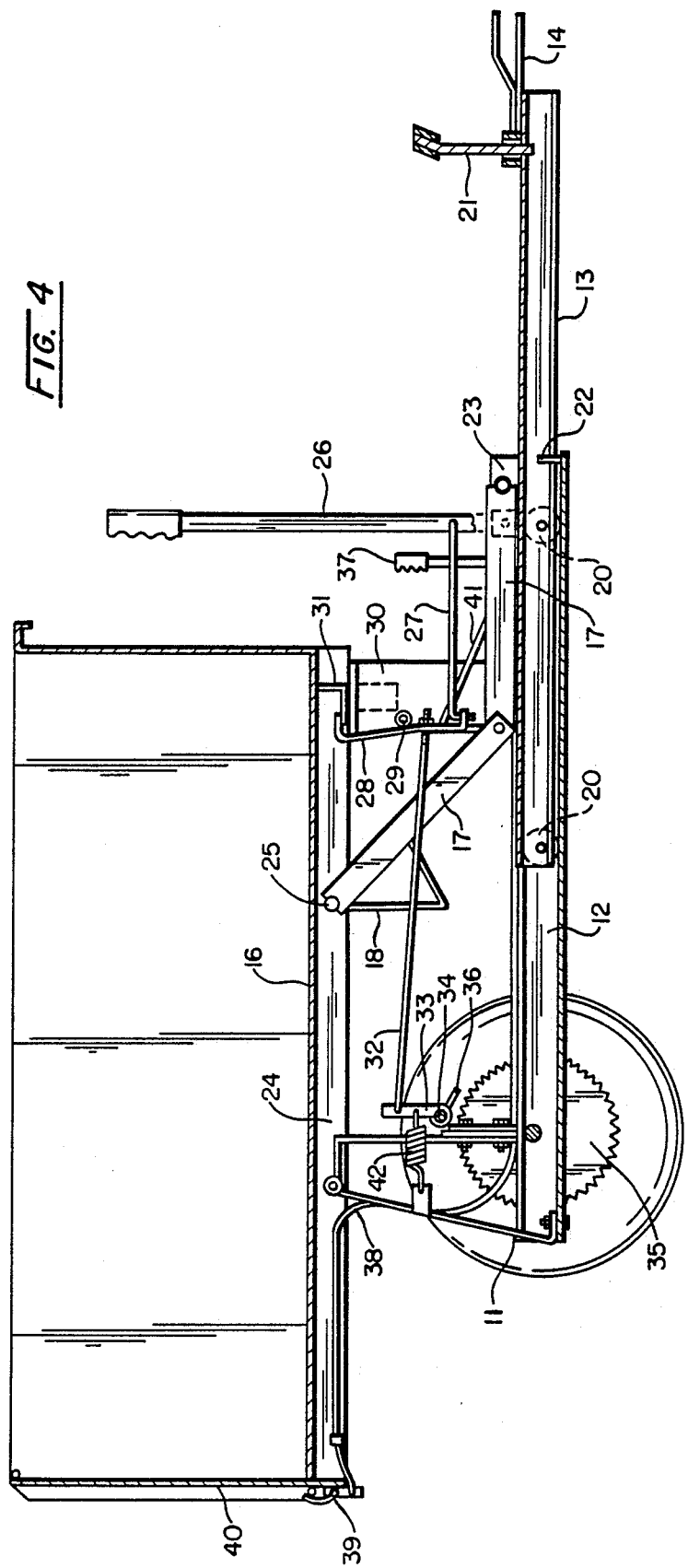
FIG. 4 is an enlarged sectional view of the present dump trailer taken along line 4—4 of FIG. 2.

The coupling end of the tongue 13 is provided with the hitch member 14 and with a hand-operated, spring-loaded locking pin 21 (FIG. 4). A stop member 22 (FIGS. 4, 5) projects upwardly from the base of the beam 12 near the front end thereof. When the actuator 13 is in the fully retracted position shown in FIG. 3, the operator may shift the locking pin 21 to a lower position, thereby engaging the stop member 22 and preventing the actuator 13 from moving out of its fully retracted position. As explained in more detail below, the present lift mechanism elevates the bed as the actuator is retracted into the beam. Thus, by locking the actuator in the retracted position, the dump trailer can be moved forward by the tractor with the bed in an inclined position, thereby spreading the material contained in the bed over a larger area.

A pair of relatively spaced apart, upwardly projecting flanges 23 at approximately the mid-point of the actuator 13 are the loci for pivotal connections with a pair of relatively spaced apart, parallel, jointed arms 17. A pivotal connection is provided generally in the middle of each arm, and the opposite ends are pivotally connected to the underside of the cargo bed 16. As indicated in FIG. 5, a pair of relatively spaced apart parallel flanges or ribs 24 extend longitudinally on opposite sides of the cargo bed midline. A pin 25 is mounted at opposite ends in the ribs 24 and is pivotally connected to the ends of the arms 17. Extending outwardly from and disposed between the arms adjacent to the mounting pin 25 is the angular stop member 18. As the actuator 13 begins to be retracted into the beam 12, the arms are urged to pivot on the pin 25 in a direction which brings the stop member 18 closer to the underside of the bed 16. Simultaneously, the bed begins to rise under the force exerted by the tractor through the actuator 13, and hence the arms 17. When the stop member 18 abuts against the cargo bed 16, the arms can no longer rotate on the pivot pin 25. The actuator 13 is still moving into the beam 12, however, so some of the force exerted by the tractor becomes focused upon the central pivot points in the arms 17. In this manner, the arms are urged to straighten themselves at their medial joints. As the actuator 13 continues to move inwardly, the arms continue to straighten, thereby pushing the front end of the cargo bed 16 upwardly until the maximum incline is attained.

As best indicated in FIGS. 4 and 5, in order for the tractor 15 to push the actuator 13 into the beam 12, a braking or wheel locking assembly is provided to prevent the trailer 10 from moving backwards as the tractor moves in reverse. For this purpose, a hand-operated braking and bed release lever 26 is pivotally mounted upon one side of the beam 12, near the front end thereof. A linkage rod 27 extends from a lower portion of the lever 26 to a lower portion of a latch member 28. The latch member 28 is pivotally mounted upon the guide pin 29 which extends between the side walls of a U-shaped, bed-supporting brace 30 extending upwardly from and inverted over the beam 12. A catch 31 extends downwardly and rearwardly from the underside of the cargo bed 16 and is releasably engaged by the latch 28, thereby holding the cargo bed in its seated position against the brace 30. A rear linkage rod 32 extends from the latch 28 to a dog 33 which, in turn, is attached to a transversely extending shaft 34. A cog or ratchet wheel 35 is mounted on an axle adjacent to each wheel of the undercarriage 11. A pawl 36 extends from each end of the shaft 34 to releasably engage the adjacent cog wheel 35 when the brake lever is pulled, thereby preventing the wheels from rotating in reverse.

A tailgate lever 37 is mounted on the beam 12 generally opposite the brake/bed release lever 26. A flexible cable 38 extends from the lever 37 to a tailgate latch 39. In this manner, the tailgate 40 at the rear end of the cargo bed 16 may be operated separately from the brake/bed lever 26, in the event that the operator chooses to open the tailgate after the bed has reached a desired inclined position. When the cargo bed 16 reaches its fully inclined position, the actuator 13 is fully retracted within the beam 12. The operator may then insert the actuator locking pin 21 into engagement with the stop 22 and release the brake/bed lever 26. The trailer 10 is then ready to be pulled by the tractor 15. Upon forward movement, the tailgate release lever 37 may be shifted to open the tailgate 40 and permit the material contained in the bed 16 to be spread generally evenly over a selected area.

After emptying the cargo, the actuator lock 21 is released and the brake/bed lever 26 is engaged. As the tractor moves forward, the actuator 13 is drawn out of the beam 12. The extension of the actuator out of the beam pulls the articulated arms 17 forward, thereby causing the bed 16 to begin to descend. At first, the arms 17 remain in their fully extended positions; however, after travelling a relatively short distance, the arms engage the guide pin 29 extending through the brace or housing 30 projecting upwardly from the beam. For this purpose, an angular plate 41 is mounted between the arms 17 adjacent to the central pivot pin connecting the first and second sections of the arm together. The plate 41 is shaped and disposed between the arms 17 in such a manner that it, rather than the arms, slidably engages the pin 29. Thus, as the actuator 13 moves outwardly from the beam 12, the plate 41 strikes the pin 29 while the arms 17 are erect, thereby forcing the arms to begin to collapse at their central joint. As the actuator and arms move further forward, the plate 41 forces the arms to collapse further, thereby permitting the plate 41 and arms to move forward under the pin 29. Eventually, the forward portions of the arms 17 rest upon the actuator 13, and the cargo bed 16 is seated upon the upper surface of the housing 30. The operator then shifts the brake/bed lever 26 to the upright position which, with the assistance of a brake spring 42, releases the pawls 36 and brings the bed latch 28 into engagement with the catch 31.

Figure 6:
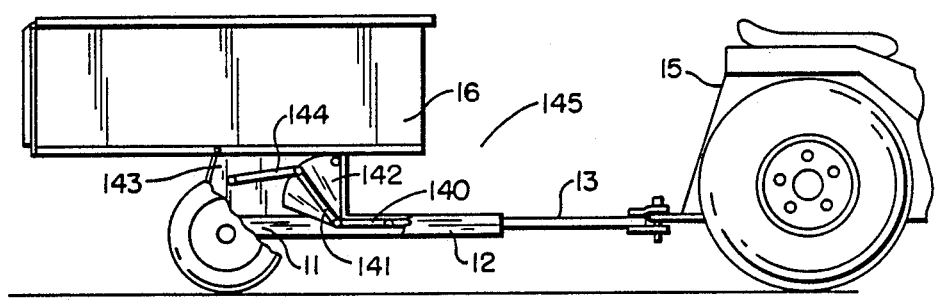
FIG. 6 is a fragmentary side elevational view illustrating an alternative embodiment of the lift mechanism.
Figure 7:
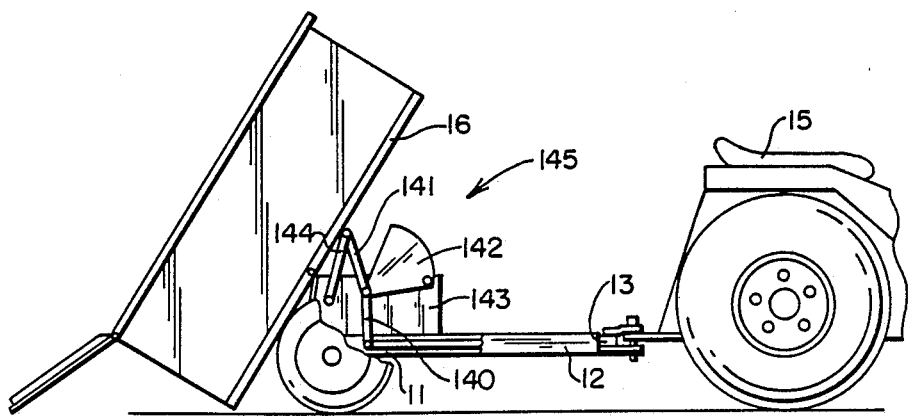
FIG. 7 is a fragmentary side elevational view of the alternative lift mechanism with the cargo bed in an inclined position.

FIGS. 6 and 7 illustrate an alternative embodiment of the present invention. As indicated therein, the actuator 13 is pivotally connected to a pair of relatively spaced apart, parallel push rods 140. The push rods, in turn, are pivotally connected to a pair of relatively spaced apart, parallel kicker rods 141 and to a lower end of a lifting cam 142 disposed between the kicker rods 141. The lifting cam 142 is pivotally connected at an upper end to a housing 143 which extends upwardly from the beam 12 and supports the cargo bed 16. The kicker rods 141 are pivotally connected at their ends opposite the push rods 140 to a pair of relatively spaced apart, parallel positioning rods 144. The positioning rods 144 are pivotally connected at their opposite ends to the housing 143 in rearwardly spaced relation to the cam 142.

When the trailer bed 16 is in a seated position resting upon the housing 143, as illustrated in FIG. 6, the curved lifting surface of the cam 142 is barely touching the underside of the trailer bed. As the actuator 13 slides into the beam 12 under the impetus of the tractor 15, the cam 142 rotates upon its pivotal connection to the housing 143, thereby shifting its lifting surface arcuately and upwardly and lifting the trailer bed 16. Simultaneously, as the actuator 13 moves into the beam 12, the pivotal connections between the positioning arms 144 and kicker rods 141 begin to move in an arc upwardly and rearwardly. Since the lifting cam 142 has begun to raise the trailer bed 16, there is additional space below the bed for the pivotal connections between the positioning and kicker rods to rise before contacting the underside of the bed. During the above-described arcuate movements, the push rod 140 is also moving upwardly, and rearwardly.

The dump trailer, generally designated 145, equipped with the above-described alternative lifting mechanism includes an undercarriage 11, a pivotally connected cargo bed or body 16, braking, bed latching and tailgate latching mechanisms and levers generally similar to those employed with the preferred lifting mechanism illustrated in FIGS. 1 through 5.

The push rods 140 transmit the force created by the inwardly moving actuator 13 to the cam 142 at substantially a 90 degree angle to the direction of cam rotation. A very large mechanical advantage is achieved at this initial actuation due to the ratio of force arm length on the cam itself. The actual mechanical advantage is limited only by the cam size and the points of force reaction. The greatest lifting force is needed when the trailer ted is horizontal and likewise, this is the point of maximum force provided by the rotating cam. As the cam 142 rotates, the trailer bed 16 revolves around its pivot point as dictated by the cam lifting force. Additionally, as the cam 142 rotates, the original mechanical advantage progressively dimensions due to the ever changing ratio of force arm lengths. However, the force generated by the push rod 140 continually increases in proportion to the cosine of its changing angle, thus offsetting the cam's decreasing mechanical advantage. Consequently, heavy loads in relation to the available force can be dumped. To achieve a very steep dump angle within the limited space illustrated in FIGS. 6 and 7, the second stage kicker rods 141 are pivotally connected with the push rods 140 and the cam 142, whereby a continuation of bed rotation is accomplished. At approximately the same time that the lifting surface of the cam has elevated the bed as far as it can, the jointed connections between the kicker and positioning rods engage the bed rearwardly of the cam and continue to lift the bed until the actuator has moved as far into the beam as it can go. The necessary force is provided by the push rod 140 with mechanical force advantage again coming from the increasing angle cosine as the actuator 13 continues its inward movement. During this second stage of lifting, the cam 142 is serving only as a connecting point and provides no force supplementation. Lowering of the bed 16 simply entails reverse movement of each of the above-described components.

Thus, it can be seen by the foregoing embodiments that the present invention provides a dump trailer whose bed can be raised and lowered by movement of the tractor and that obtains a satisfactory dumping angle for the cargo bed. While alternative preferred embodiments have been illustrated and described in some detail, the foregoing disclosure is not intended to unduly limit or restrict the spirit and scope of the invention or following claims.

I claim:

1. A dump trailer which comprises: a wheeled undercarriage; an elongated actuator telescopically mounted on the undercarriage for movement in relatively opposing, first and second directions; hitch means attached to the actuator; a cargo bed pivotally mounted upon the undercarriage; and lift means responsive to the movement of the actuator to raise and lower the cargo bed, said lift means including a jointed arm movable between elevated and lowered positions and pivotally connected at one end to the actuator and at an opposite end to the cargo bed, stop means disposed between the arm and the cargo bed for limiting pivotal movement of said arm relative to the cargo bed as the actuator moves in the first direction, and guide means disposed between the undercarriage and the arm for engaging said arm and urging it toward the lowered position as the actuator moves in the second direction.

2. The dump trailer according to claim 1, and further provided with wheel locking means, and including a hand-operated lever for actuating said wheel locking means.

3. The dump trailer according to claim 1, and further provided with hand-operated actuator locking means.

4. The dump trailer according to claim 1, and further provided with a tailgate and tailgate latching means, and including a hand-operated lever for actuating said tailgate latching means.

* * * * *